US008113794B2

(12) United States Patent
Schneider et al.

(10) Patent No.: US 8,113,794 B2
(45) Date of Patent: Feb. 14, 2012

(54) INTEGRATED INTERNAL GEAR PUMP WITH AN ELECTRIC MOTOR

(75) Inventors: Willi Schneider, Bodelshausen (DE); Torsten Helle, Tuebingen (DE)

(73) Assignee: Joma-Polytec Kunststofftechnik GmbH, Bodelshausen (DE)

(*) Notice: Subject to any disclaimer, the term of this patent is extended or adjusted under 35 U.S.C. 154(b) by 165 days.

(21) Appl. No.: 12/652,811

(22) Filed: Jan. 6, 2010

(65) Prior Publication Data

US 2010/0111722 A1 May 6, 2010

Related U.S. Application Data

(63) Continuation of application No. PCT/EP2008/005415, filed on Jul. 3, 2008.

(30) Foreign Application Priority Data

Jul. 25, 2007 (DE) ........................ 10 2007 035 239

(51) Int. Cl.

| | |
|---|---|
| ***F04B 17/00*** | (2006.01) |
| ***F04F 5/42*** | (2006.01) |
| ***H02K 21/12*** | (2006.01) |
| ***H02K 7/06*** | (2006.01) |
| ***H02K 7/10*** | (2006.01) |

(52) U.S. Cl. ..................... 417/356; 417/410.4; 417/171; 310/156.38; 310/80

(58) Field of Classification Search .................. 417/355, 417/356, 410.4; 310/156.38, 156.43, 156.44, 310/80, 83, 156.53, 43, 156.23, 156.28; 418/166–171; *H02K 1/27*

See application file for complete search history.

(56) References Cited

U.S. PATENT DOCUMENTS

| | | | | |
|---|---|---|---|---|
| 4,626,722 | A * | 12/1986 | Fukui | 310/82 |
| H1966 | H * | 6/2001 | Henry et al. | 417/356 |
| 2003/0228237 | A1 | 12/2003 | Holtzapple et al. | |

FOREIGN PATENT DOCUMENTS

| | | |
|---|---|---|
| DE | 299 13 367 U1 | 7/1999 |
| DE | 299 03 512 | 9/1999 |
| DE | 102 48 933 | 12/2003 |
| DE | 10 2006 007554 | 8/2007 |
| EP | 1 803 938 | 7/2007 |
| EP | 1 892 415 | 2/2008 |

(Continued)

OTHER PUBLICATIONS

JP-2003-164082-A-Translated-Description.*

(Continued)

*Primary Examiner* — Devon C Kramer
*Assistant Examiner* — Thomas Fink
(74) *Attorney, Agent, or Firm* — Brinks Hofer Gilson & Lione

(57) ABSTRACT

The invention relates to a rotor pump having an internally toothed outer ring and an externally toothed inner ring which is mounted therein and intermeshes therewith, wherein the outer ring and the inner ring are arranged axis-parallel to one another, and the axes of the outer ring and of the inner ring are at a distance from one another, and the outer ring is connected to a hollow shaft motor with a stator which is fitted with windings, and to a rotor which is rotatably mounted therein, characterized in that the outer ring forms the rotor of the hollow shaft motor.

3 Claims, 3 Drawing Sheets

FOREIGN PATENT DOCUMENTS

| | | | | |
|---|---|---|---|---|
| JP | 01182585 | A | * | 7/1989 |
| JP | 02 027181 | | | 1/1990 |
| JP | 04 314983 | | | 11/1992 |
| JP | 11 210642 | | | 8/1999 |
| JP | 2003-164082 | A | * | 6/2003 |

OTHER PUBLICATIONS

JP-401182585-A-Translated-Abstract.*
Search Report DE 10 2007 035 239.7-15.
Search Report PCT/EP2008/005415.

* cited by examiner

INTEGRATED INTERNAL GEAR PUMP WITH AN ELECTRIC MOTOR

CROSS-REFERENCE TO RELATED APPLICATIONS

This application is a continuation of International Application No. PCT/EP2008/005415 filed on Jul. 3, 2008, which claims priority to DE 10 2007 035 239.7, filed on Jul. 25, 2007. The disclosures of the above applications are incorporated herein by reference.

FIELD

The present disclosure relates to a rotor pump.

BACKGROUND

The statements in this section merely provide background information related to the present disclosure and may not constitute prior art.

It is generally known that liquids can be delivered and gases can also be compressed by means of rotor pumps. An externally geared inner ring meshes with an internally geared outer ring for this purpose, wherein the inner ring is positioned eccentrically with respect to the outer ring and is driven by a suitable drive unit. If the inner ring has five gears, for example, then these mesh between six gear teeth of the outer ring. The fluid is drawn into five operating chambers and then displaced out of these with each revolution of the inner ring.

An internal gear pump of this kind is known from German Patent DE 299 13 367 U1, in which the outer ring is driven using a hollow shaft motor. A rotor bearing a permanent magnet is arranged around the outer ring, wherein the outer ring and the rotor are connected to each other in a suitable manner, so that the rotor can drive the outer ring. It is considered disadvantageous that an internal ring pump of this kind has large dimensions in the radial direction and that a large number of parts are required and must be installed.

SUMMARY

The present disclosure provides a rotor pump having smaller dimensions and fewer components with about the same delivery capacity.

This is attained according to the present disclosure with a rotor pump, in that the outer ring forms the rotor of the hollow shaft motor.

The integration of the rotor of the hollow shaft motor into the outer ring has the basic advantage that one component is dispensed with and that at the same time, the radial dimension can be reduced. In addition to saving components, a rotor pump of this kind is also lighter. The installation is also easier, since no rotor must be connected to the outer ring. The inner ring runs loosely along around an axis. It is advantageous that relatively great rotation or tangential forces can be transmitted and that there is no danger that vibrations or extreme temperature fluctuations will cause a detachment of the rotor from the outer ring.

A further variant provides that the magnets for the hollow shaft motor are arranged between the gaps of the gear teeth or in the teeth of the outer ring. The installation size is also reduced in this way, since the space between the teeth is utilized to accommodate the magnets for the hollow shaft motor. The magnets can assume herein particular shapes that are adapted to the shape of the teeth.

It is provided in one form that the outer ring has recesses for accommodation of the magnets, which are formed by breakthroughs or counterbores. Relatively large magnets can be accommodated by the breakthroughs, whereas magnets can be placed in the counterbores from both sides.

The recesses have a basically lenticular cross section in order to be able to optionally utilize the space existing between the gaps located between the teeth. The cross sectional shape of the magnets is correspondingly adapted.

Optimal drive forces are generated in that the partition of the stator is equal to the partition of the outer ring or corresponds to a whole number multiple of the partition of the outer ring.

In another form, the outer ring is made of aluminum or plastic. In this way, the weight of the rotor pump is further reduced and a rotor such as this can be economically produced.

Further features, advantages and details of the present disclosure arise from the dependent claims as well as the following description, in which one form of the present disclosure is described in detail with reference to the drawings. The features represented in the drawing and also mentioned in the description and the claims can be a part of the present disclosure either individually or in any desired combination.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
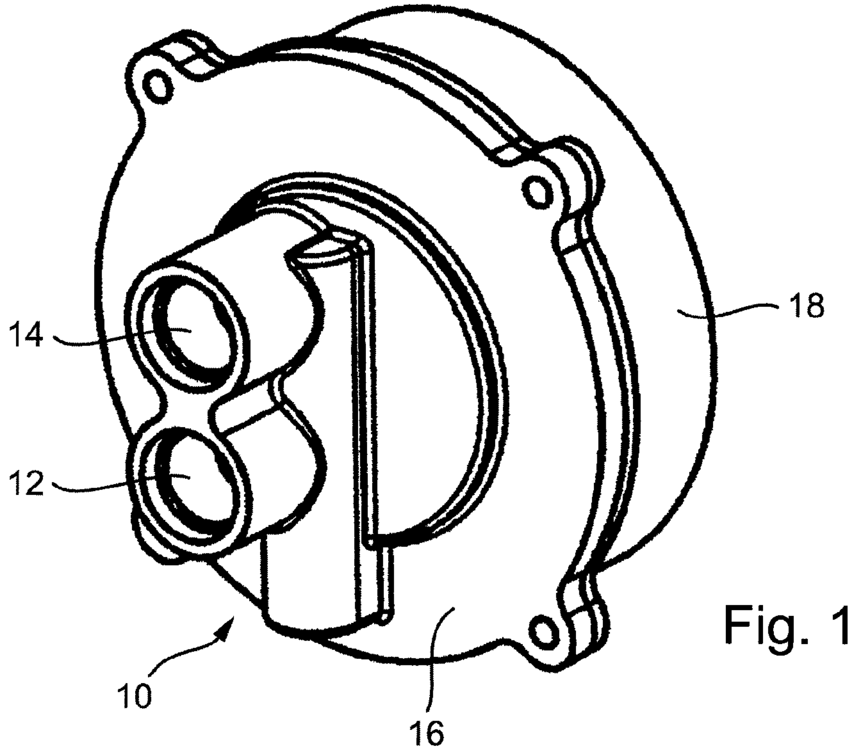
FIG. 1 shows a perspective representation of the rotor pump according to the present disclosure.

In FIG. 1 a rotor pump identified with reference numeral 10 is represented, with which for example liquid, in particular oil for an engine, such as an internal combustion engine or urea for an exhaust gas purification system, is delivered. The rotor pump 10 is provided for this purpose with an inlet 12 and an outlet 14. The inlet 12 and the outlet 14 are provided in a housing cover 16, which is flange connected to a housing pot 18. The inlet 12 and the outlet 14 change with a change in the direction of rotation. It can be clearly seen that the rotor pump 10 is self-contained and is open toward the outside only via the inlet 12 and the outlet 14. No drive shaft or the like leads into the rotor pump 10, so that seals therefor are unnecessary. A rotor pump 10 such as this meets high tightness demands.

Figure 2:
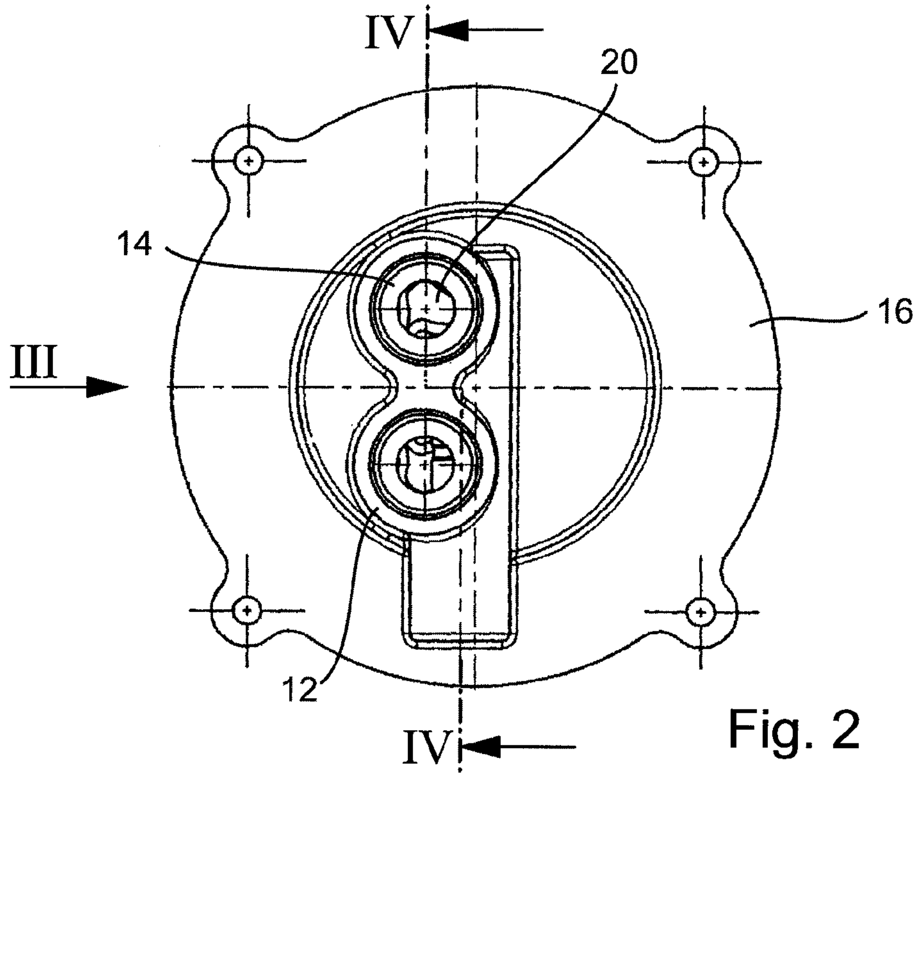
FIG. 2 shows a plan view of the rotor pump.
Figure 3:
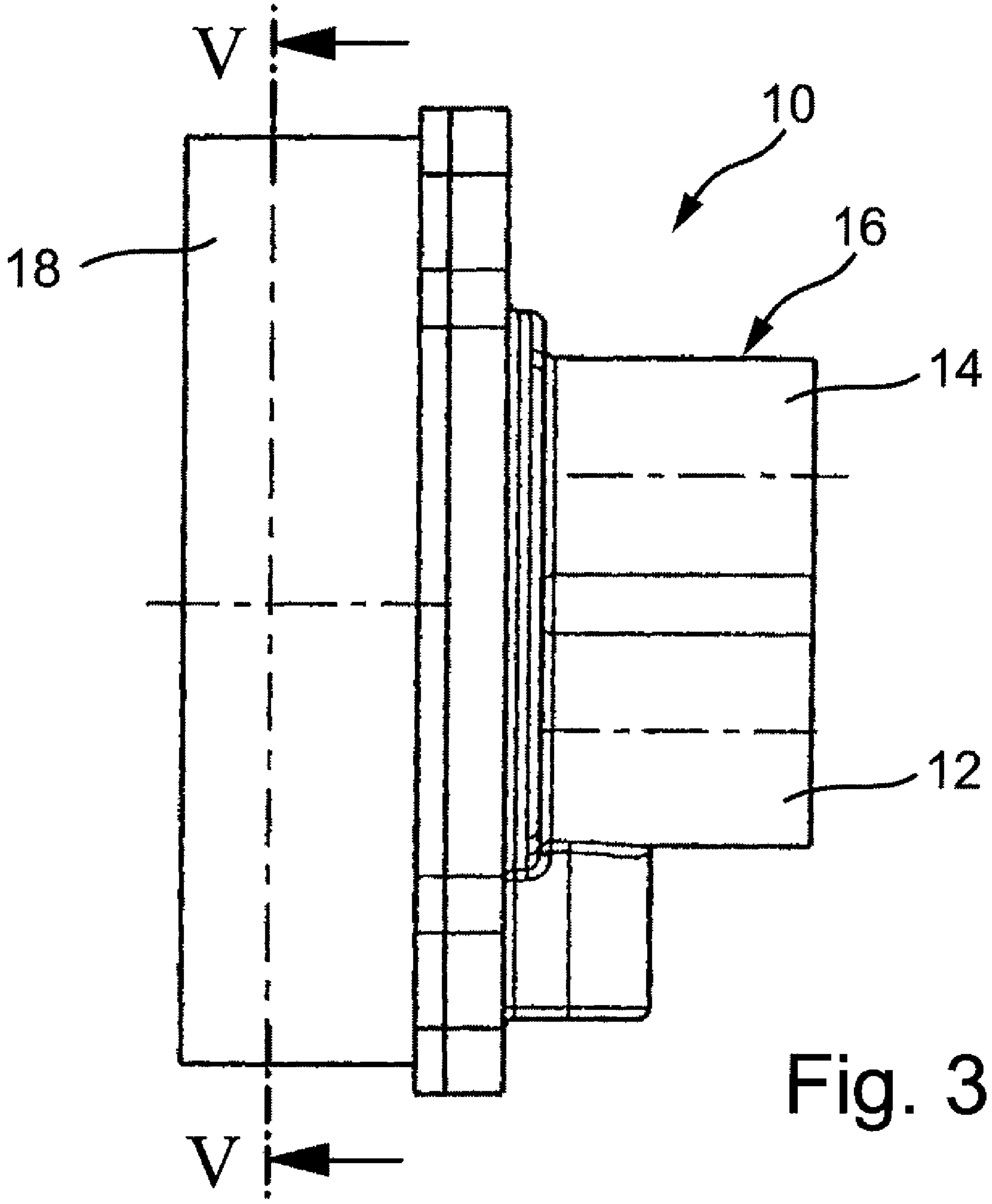
FIG. 3 shows a lateral view of the rotor pump in the direction of the arrow III according to FIG. 2.
Figure 4:
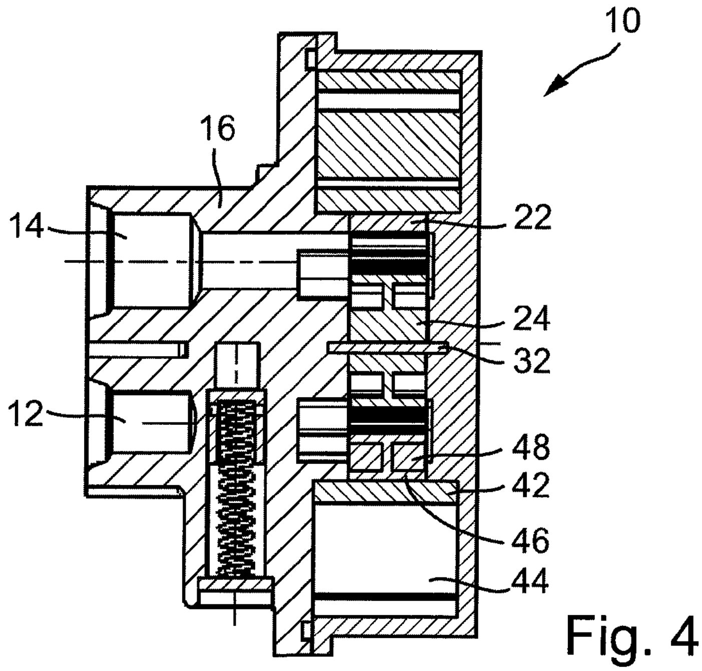
FIG. 4 shows a section IV-IV according to FIG. 2.

FIG. 2 shows a plan view of the housing cover 16 and displacement spaces 20 can be seen through the inlet 12 and the outlet 14. FIG. 3 shows the rotor pump 10 in lateral view and FIG. 4 shows the latter in longitudinal section with the housing pot 18 removed.

Figure 5:
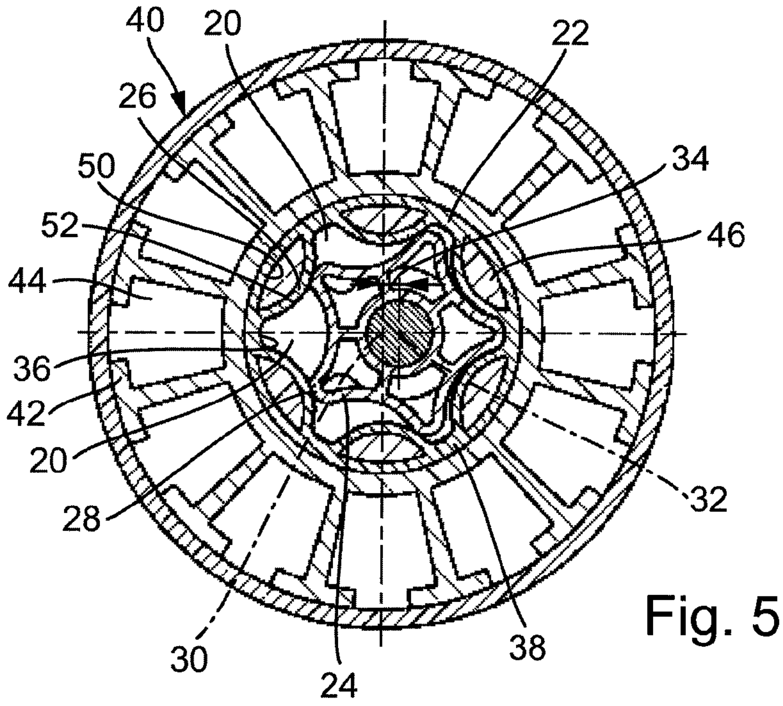
FIG. 5 shows a section V-V according to FIG. 3.

As can be seen in the cross section according to FIG. 5, the displacement spaces 20 are formed between an outer ring 22 and an inner ring 24. The outer ring 22 is internally geared herein and has a total of six inwardly projecting teeth 26 in the shown embodiment, between which are located gaps 36. The inner ring 24 is externally geared and has a total of five outwardly directed teeth 28, which engage in the gaps 36 between the teeth. The teeth 26 and 28 mesh and form therein the displacement spaces 20. In addition, the outer ring 22 and the inner ring 24 are oriented coaxially with respect to each other, whereas their axes 30 and 32 have a distance 34 (eccentricity) with respect to each other.

The outer ring 22 forms the rotor 38 of a hollow shaft motor 40 and is rotatably mounted in a stator 42. This stator 42 has receptacles 44 for reels (not represented) open radially outward and running in longitudinal direction, whereas the outer ring 22 forming the rotor 38 has recesses 46 for magnets 48 (FIG. 4). The recesses 46 of the represented embodiment are herein configured as counterbores, so that a magnet 48 can be inserted from each side. The cross section of the recesses 46 is basically lenticular in shape with a first, radially outer peripheral surface 50, which is bent around the axis 30, and a second, radially inner peripheral surface 52, which follows the profile of the tooth 26.

It can also be clearly seen in FIG. 5 that a rotation of the outer ring 22 causes a rotation of the inner ring 24 around its axis 32, so that the teeth 26 and 28 mesh, whereby the size of the displacement spaces 20 are altered.

A rotor pump 10 of this kind not only has a simpler design, but also possesses a low weight and can be effortlessly installed, and has in addition a greater delivery volume at about the same rotational speed. The radial dimensions are furthermore relatively small due to the integration of the magnets 48 in the outer ring 22. It is further clearly visible in FIG. 5 that the housing of the rotor pump 10, that is, its housing cover 16 and its housing pot 18, are not penetrated by any components, and therefore no leakage is to be feared.

It should be noted that the disclosure is not limited to the forms described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A rotor pump with an internally geared outer ring and an externally geared inner ring mounted therein and meshing therewith, wherein the outer ring and the inner ring are arranged axially parallel to each other and the axis of the outer ring and the axis of the inner ring have a distance with respect to each other, and wherein the outer ring is driven using a hollow shaft motor with a coil-bearing stator and a rotor rotatably mounted therein, characterized in that the outer ring forms the rotor of the hollow shaft motor and includes a plurality of teeth, and recesses formed in the plurality of teeth for accommodating magnets, the recesses and the magnets having a lenticular cross section that follows the profile of the corresponding tooth.

2. The rotor pump according to claim 1, characterized in that the recesses are formed by at least one of breakthroughs and counterbores.

3. The rotor pump according to claim 1, characterized in that the outer ring is made of aluminum or plastic.

* * * * *